J. J. HUMMEL.
TYPE SETTING AND DISTRIBUTING MACHINE.
APPLICATION FILED JAN. 15, 1917.

1,288,006.

Patented Dec. 17, 1918.
8 SHEETS—SHEET 1.

INVENTOR
John J. Hummel
BY
L. L. Westfall
ATTORNEY

J. J. HUMMEL.
TYPE SETTING AND DISTRIBUTING MACHINE.
APPLICATION FILED JAN. 15, 1917.

1,288,006.

Patented Dec. 17, 1918.
8 SHEETS—SHEET 4.

INVENTOR
John J. Hummel
BY
L. L. Westfall
ATTORNEY

J. J. HUMMEL.
TYPE SETTING AND DISTRIBUTING MACHINE.
APPLICATION FILED JAN. 15, 1917.

1,288,006.

Patented Dec. 17, 1918.
8 SHEETS—SHEET 5.

INVENTOR
John J. Hummel
BY
L. L. Westfall
ATTORNEY

J. J. HUMMEL.
TYPE SETTING AND DISTRIBUTING MACHINE.
APPLICATION FILED JAN. 15, 1917.

1,288,006.

Patented Dec. 17, 1918.
8 SHEETS—SHEET 6.

INVENTOR
John J. Hummel
BY
L. L. Westfall
ATTORNEY

UNITED STATES PATENT OFFICE.

JOHN J. HUMMEL, OF SPOKANE, WASHINGTON.

TYPE SETTING AND DISTRIBUTING MACHINE.

1,288,006.  Specification of Letters Patent.  Patented Dec. 17, 1918.

Application filed January 15, 1917. Serial No. 142,447.

*To all whom it may concern:*

Be it known that I, JOHN J. HUMMEL, a citizen of the United States of America, residing at Spokane, in the county of Spokane and State of Washington, have invented certain new and useful Improvements in Type Setting and Distributing Machines, of which the following is a specification.

Among the principal objects which the present invention has in view are: to provide a mechanism whereby type having a body smaller than the head may be set and distributed; to provide magazines that are divided into sections, each section containing a number of type chambers, raceways leading from the type chambers into a common raceway, and each one of the common raceways leading to a common delivery point.

The main object of dividing the magazine into a number of smaller magazines, each complete in itself, called sections, is to make it possible to have a magazine exceedingly compact in form, and to greatly reduce the distance necessary for the type to travel in order to reach the common delivery point. Reducing the width and height of the magazine by cutting it up into sections, and placing the sections parallel one behind the other, makes it possible to make the entire structure of the machine much more compact, and greatly reduce its size and corresponding weight, and thus make it more suitable to be used in business offices for setting type for form letter work, which is one of the principal objects of the invention.

A further object of the invention is to have the magazines removable, and to have a plurality of magazines in the machine at one time. In the present construction there are two such magazines from which type may be set by means of a magazine shift for the purpose of selecting the magazine desired, one letter shift to select the upper or lower case, and a common keyboard to extract the letters from the magazines in the order of their composition.

A further object of the invention is to have a mechanism for distributing the type back into the magazines; the mechanism being operated in the present construction by the operation of the keys and other manually operative controlling devices.

One embodiment of the present invention is disclosed in the structure illustrated in the accompanying drawings, in which like characters of reference denote corresponding parts in all the views, and in which—

In its operation, the machine performs in serial order the following functions, and in the order named. The first operation consists in selecting the particular magazine from which the type are to be selected and successively composed. The second operation is to extract from the type chambers of the selected magazine the various letters in the order used. The third operation is to convey the type by gravity to a common point, in line formation, and in the order of their composition. The fourth operation is to by hand or any other convenient method place the type in a type carriage for distribution back into the type chambers of the magazines.

By means of a frame 18, the mechanisms are structurally connected.

Figure 3:
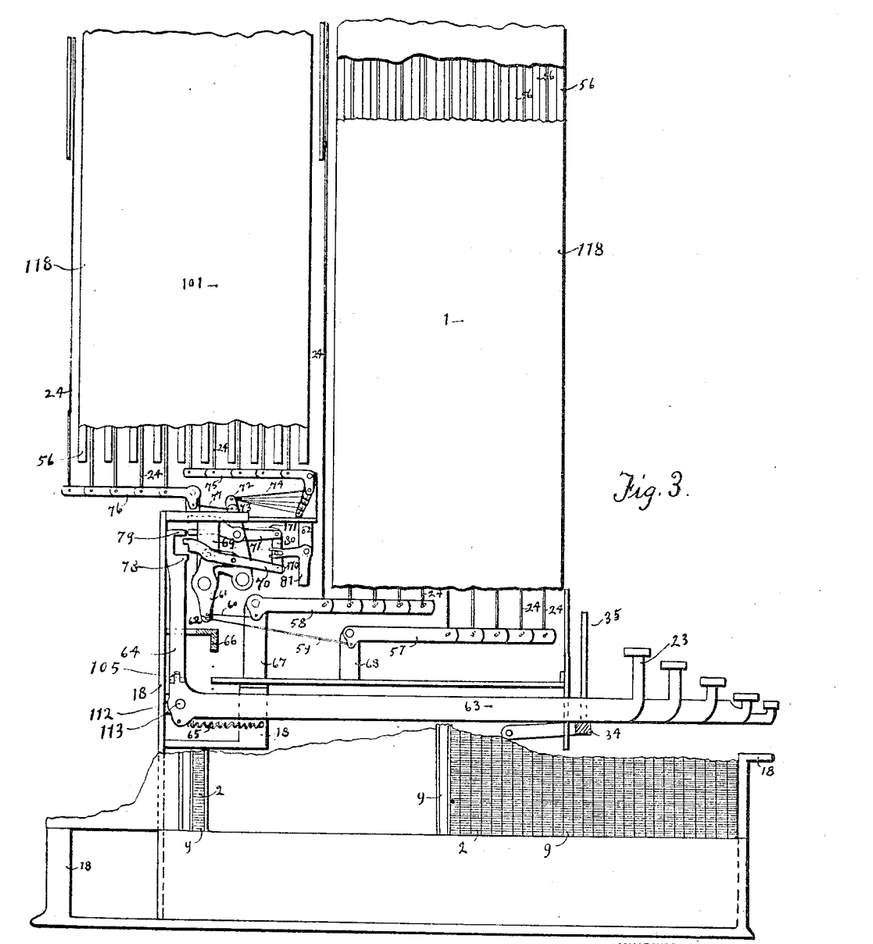
Fig. 3 is a side elevation of the lower part of the machine, the view being taken below the line *a, a*, of Fig. 1, and by cutting away parts of the magazine and frame the structure of the shift mechanisms, the keyboard, and the internal structure of the magazines is disclosed.
Figure 4:
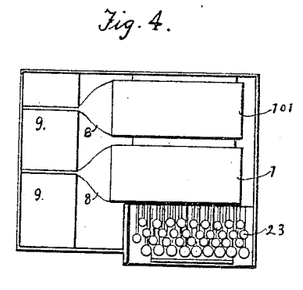
Fig. 4 is a horizontal view, that portion of the machine below the line *a, a*, of Fig. 1.
Figure 14:
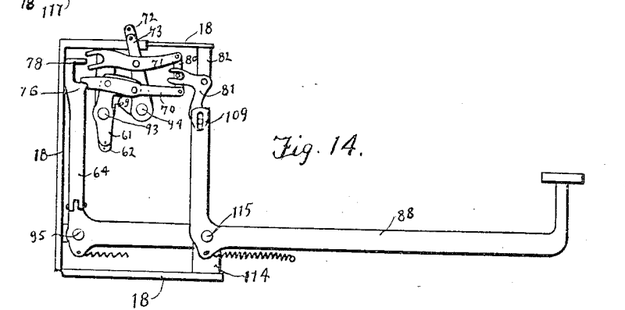
Fig. 14 is a vertical side detail view of the magazine shift mechanism, and a portion of the letter shift mechanism.
Figure 15:
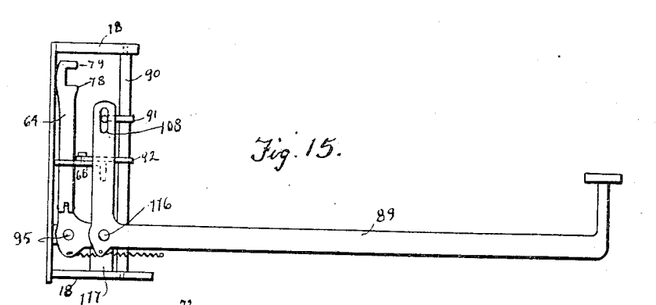
Fig. 15 is a side elevation of the letter shift, for selecting the upper or lower case in either one of the magazines.
Figures 16, 17:
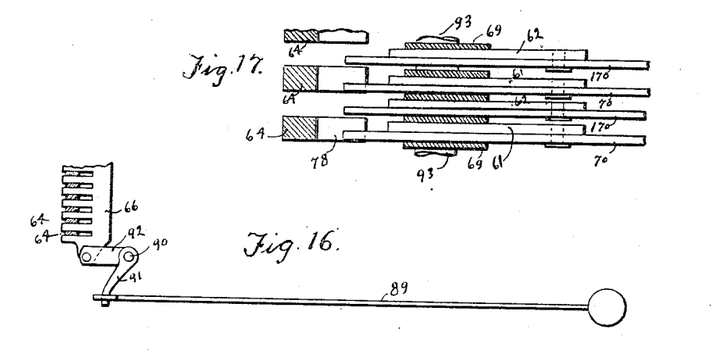
Fig. 16 is a horizontal fragmentary view of the same.
Fig. 17 is a greatly enlarged view, horizontal, and fragmentary in form of the same.
Figure 18:
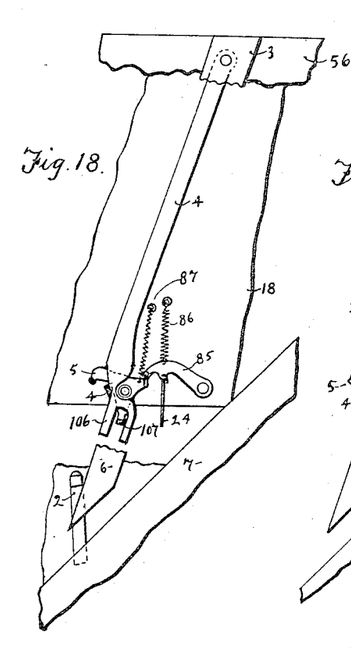
Fig. 18 is a vertical front view of the type escapement mechanism, disclosing a portion of the frame, a portion of the type chamber, a portion of a raceway, a portion of the common raceway, holding and releasing pawls, an operating pawl, and a type in the act of passing down the raceway and entering into the common raceway.
Figures 19, 20:
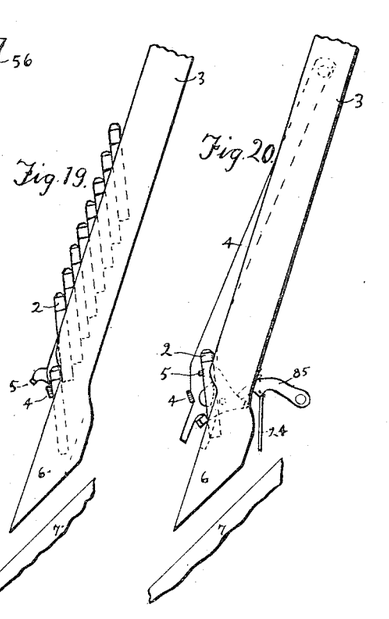
Fig. 19 is a vertical detail front view of a type chamber, disclosing the manner in which the type is held therein.
Fig. 20 is a vertical front view of a type chamber, the escapement mechanism, and disclosing the manner that the type column is held back by the holding pawl when the releasing pawl is in the act of releasing a type.
Figure 21:
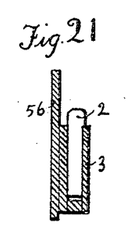
Fig. 21 is a vertical view in cross section of a type chamber, disclosing the manner of holding type having a part of one side of the body cut away in part, leaving an overlapping projection or ear on one side of the head, by which it is suspended from the edge of the outer wall of the type chamber.
Figure 22:
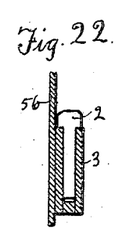
Fig. 22 is the same, except that both sides of the body of the type have been partly cut away.
Figure 23:
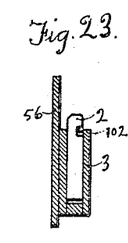
Fig. 23 discloses a modification of the outer wall of the type chamber, showing an overlapping edge, and a type having an even body suspended on said overlapping edge by means of a groove or nick having been cut into said type to receive said overlapping edge.
Figure 24:
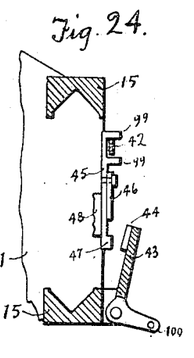
Fig. 24 is a cross sectional vertical view of the tramcar and the escapement mechanism of the type carriage, and discloses the manner that the escapement mechanism is released from contact with the escapement bar, to permit the type carriage to be returned by a continuous movement to its starting point.

The present construction consists of a number of groups of mechanisms, all of which are connected and dependent one on the other. The first group consists of a keyboard 23. This group is composed of a series of bell crank levers 63, which are secured to the frame 18 by means of side hangers 112, through which passes a rod 113, which serves as a pivot for said levers. To the bell crank levers 63 a spring 65 is attached, which also connects with the frame 18, and serves to hold the said levers up, and when operated to return them to their normal position. Said levers have a vertical arm 64, which is jointed to said levers by means of a hinge joint 105. Said vertical arms have each two projecting points 78 and 79. The point 78 is for the purpose of engaging the lever 70, when the same is placed in the position as disclosed in Fig. 14. The lever 70 is pivoted to the lever 61. The lever 61 is supported by a hanger 69, which is attached to the frame 18. A rod 93 passes through the levers 61 and 62 and the hangers 69. The lever 61 is connected by a wire 60 to the lever 58. The lever 62 is similar in form to the lever 61, and to it is connected a lever 170, Fig. 17, which is similar in form to the lever 70. The lever 62 is connected by a wire 59, which connects with a lever 57. The lever 58 is supported by a standard 67, and the lever 57 is supported by a standard 68, which are secured to the frame 18. The levers 61, 70, and 58, with the wire connections 60 constitute a group of elements that connect up with one-half of the type chambers of the magazine 1, by the wire connections 24, which connect with the type escapement mechanism disclosed in Figs. 18, 19, and 20. Levers 170, 62, and 57, with the wire connections 59, constitute a group of elements that connect up with the other half of the type chambers of magazine 1, and by the same means. These two groups of elements constitute a letter shift for the magazine 1. Either one of these groups may be brought in contact with the point 78, of the arm 64, of the bell crank lever 63, of the keyboard 23. There being one set of these elements for each one of the bell crank levers 63 of which the keyboard 23 consists the movement of the arm 64 by the shift lever 89, Figs. 15, 16, and 17, will bring either 58 or 57 in direct connection with the keyboard 23. There are two other groups of elements, which connect up with the magazine 101, and are similar to the other two groups, which connect up with the magazine 1. The one group of elements that connect up with the type escapement mechanism of magazine 101, consists of levers 76, wire connections 77, and 24, and levers 73 and 71. The other group of elements that connect up with magazine 101 consists of wire connections 24, levers 75, wire connections 74, levers 72, and 171. The levers 72 and 73 are pivoted and attached to the hangers 69, which are secured to the frame 18. The levers 71 and 171 connect up with the point 79 in a manner similar to the manner that the levers 70 and 170 connect up with the point 78. Only one magazine is connected at one time with the keyboard. In order to connect the keyboard with either one of the magazines a magazine shift is provided, as disclosed in Figs. 3 and 14. The magazine shift consists of a bell crank lever 88, which is pivoted to the frame 18 by a standard 114 and a rod 115. The vertical end of the bell crank lever 88 is slotted, to receive a pin 109 of the bell crank 81. The bell crank 81 is pivoted to a hanger 82, which is secured to the frame 18. The levers 70 and 71 are connected with a connecting rod 80, which is operated by the bell crank 81, which in turn is operated by the bell crank lever 88. In Fig. 14 the position of the magazine shift is shown as being connected with magazine 1, and in Fig. 3 it is shown as connected with magazine 101. In Fig. 3 the bell crank 81 is shown as broken off, and the bell crank lever 88 is omitted from the drawing. The letter shift consists of a bell crank lever 89, Figs. 15 and 16, and is pivoted by a rod 117 to a standard 116, which is secured to the frame 18. The bell crank lever 89 has a vertical arm 108, slotted at the end to receive the end of the crank 91, which is tightly secured to a shaft 90, which has bearings in the frame 18, and is connected with a shift bar 66 by means of the crank 92. The shift bar 66 holds the arms 64 of the bell crank lever 63 of the keyboard 23, and moves said arms back and forth from one set of levers 70, to another set of levers 170, for magazine 1, and levers 71 to levers 171, for magazine 101, as disclosed in Figs. 3, 15, 16, and 17.

In the present construction each one of the magazines consists of ten sections 56, firmly secured together by means of a frame 118, each section containing ten type chambers 3, each type chamber leading into a raceway 6, and each raceway leading into a common raceway 7, which when it passes beyond the magazine walls becomes a curved passage 8, leading to a common delivery point 9, as is disclosed in Figs. 1, 2, 3, 4, 18, 19, 20, 21, 22, 23, respectively.

The type escapement mechanism consists of a pawl 85, which is pivoted and secured to the frame 18, is connected with the keyboard 23 by means of a wire 24, which is connected as previously described, and is held in position by a spiral spring 86, which is secured to the frame 18. That portion of the frame 18 illustrated in Fig. 18, consists of thin sheets of metal placed between each magazine section, and comprises a part of the general frame structure of the machine. The type escapement mechanism further consists of a holding pawl 5, and a releasing pawl 4, and the outer wall of the type chamber 3, which at this point where the type chamber terminates and the raceway 6 begins, the edge upon which the type rides is lowered abruptly to the level of the edge of the outer wall of the raceway 6, as disclosed in Figs. 2, 19, and 20. The pawl 5 serves the purpose of holding back the column or last type, when the releasing pawl 4 releases a type, as disclosed in Fig. 20. The holding pawl 5 is slidably connected and operated by the pawl 85, and is loosely jointed to the releasing pawl 4, and operates the same, as disclosed in Figs. 18 and 20.

The magazines are held in position in the frame 18 by means of a tongue 25 and a groove 29. To lift the magazine out of the machine all that is necessary to do is to lift it sufficiently so that the tongue 25 will clear the groove 29, and if desired another magazine of similar construction may be put in its place. The spring 87 is attached to the holding pawl 5, and is secured to the back plate of the magazine section 56, which is shown as partly broken away in Fig. 18.

Another group of mechanism pertains to distributing the type 2 back into the magazines 1 and 101. This group of mechanism is operated by the keyboard 23, in that an operating bar 34 is placed beneath the bell crank levers 63, of the keyboard 23, as disclosed in Figs. 3, 5, 6, and 7. The operating bar 34 is connected to the lever 36 by a connecting rod 35. The lever 36 is connected by a connecting rod 37 to a rocker 40, which is secured to a rocking shaft 39, and operates the rocking bar 38, which operates the rocking bar 42, which operates the escapement pawl 45. The rocking shaft 39 has bearings in the frame 18. The locking bar 38 has bearings in the frame 18. The rocking bar 42 has bearings in the tramcar 15. The escapement pawl 45 is pivoted at 48 and secured by a joint to the type carrier 11. The escapement pawl 45 has a small pawl 46 connected to, which serves to pass beyond the lugs 44 of the bar 43, which is attached to the tramcar 15, and intercepts the next lug in order of travel when the rocking bar 42 operates the escapement pawl 45, by turning it downward, so that the point 47 is released from contact with the lug 44, as disclosed in Figs. 7, 12, 13, and 24.

Firmly secured to the frame 18 there are two rails 14, that serve as a tramway for the tramcar 15. The rails 14 are set at an angle of thirty degrees, so that the tramcar 15 may operate by gravity on an inclined plane. The movement of the tramcar 15 downgrade may be regulated by a similar escapement movement as is provided for the type carriage 11; but such escapement movement is not disclosed in the drawings, except in part by a dotted outline 103.

A type carriage 11 is slidably connected and held in place by ball bearings 118, to the tramcar 15. The type carriage consists of a series of type chambers 10, type feed lever 12 (Fig. 2) and feed plunger 84 connected therewith, and a spring 22 to operate said plunger 12. There is also attached to the type carriage 11 a type holding and releasing finger 51, which is operative in the type chamber 10, and is connected by a bell crank 96, and a connecting rod 97, to a lever 98, which is slidably connected with the rocking bar 42, and is operated by the same, to draw inward the column of type contained in the type chamber 10 when the type carriage 11 is about to move forward, and to release the type for distribution when the type carriage 11 is at rest, as disclosed in Figs. 3, 5, 10, 11, 12, and 13, and 1, and 24.

Figure 2:
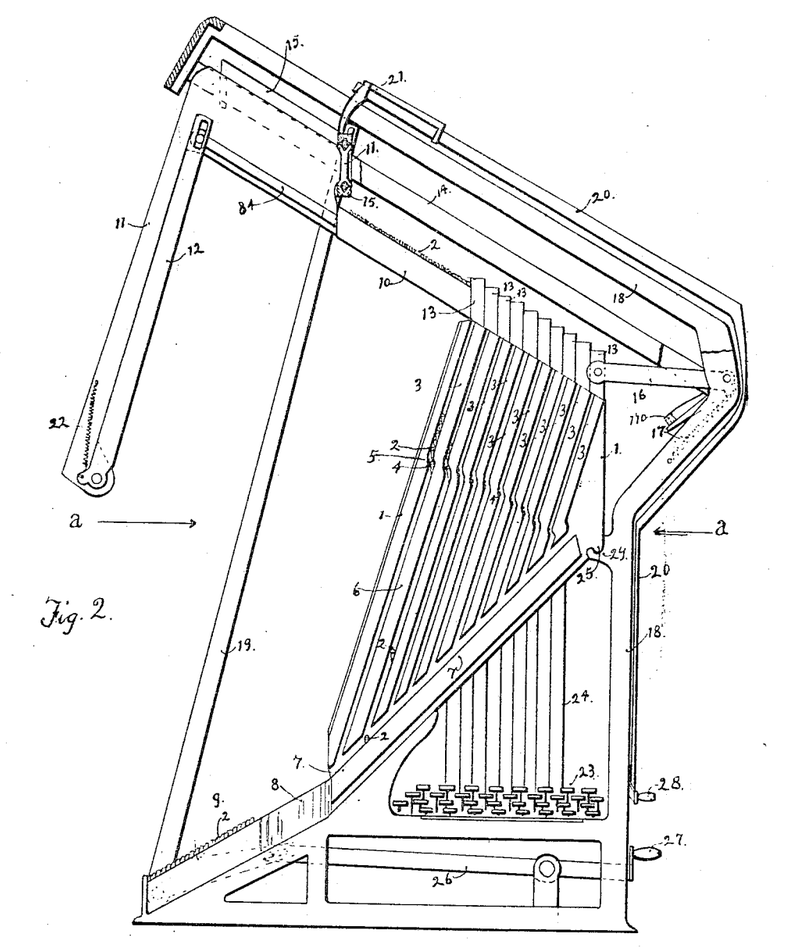
Fig. 2 is a front elevation of the same.
Figure 5:
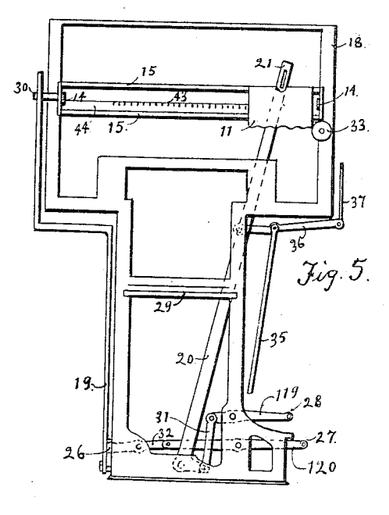
Fig. 5 is a side elevation fragmentary in form, disclosing the mechanism for the movement of the type carriage, and the tramcar.
Figure 6:
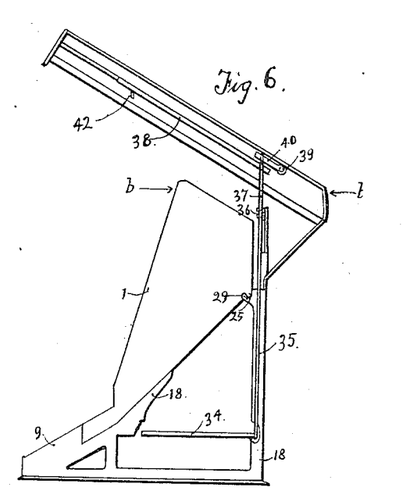
Fig. 6 is a front elevation fragmentary in form, disclosing some of the mechanism for moving the type carriage step by step.
Figure 7:
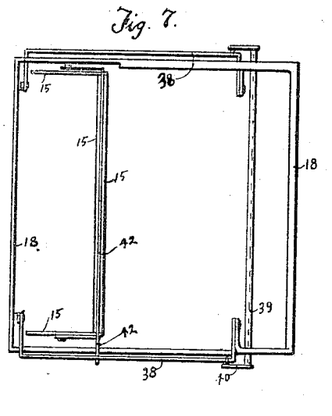
Fig. 7 is a horizontal view fragmentary in form taken above the line *b, b*, of Fig. 6, and discloses a part of the mechanism for moving the type carriage step by step.

The return movement of the type carriage 11 is accomplished by means of a series of levers, as disclosed in Figs. 2 and 5. The first lever 119 has a handle 28, is pivoted to the frame 18, and is connected by a connecting rod 31 to the second lever 20, which is pivoted to the frame 18 at its lower end, and at its upper end serves as a slide for a sliding thimble 21, which is connected to the type carriage 11. As illustrated in Fig. 2 the lever 20 is bent around one side of the frame 18 and partly over it. The operator by pressing the handle 28 of the lever 119, returns the type carriage 11 to its starting point. To the frame of the tramcar 15 there is attached a motor spring 33, which is wound up by the return of the type carriage 11, and pulls the same toward it by a step by step movement when the escapement 45 is operated.

Figures 1, 10, 11, 12:
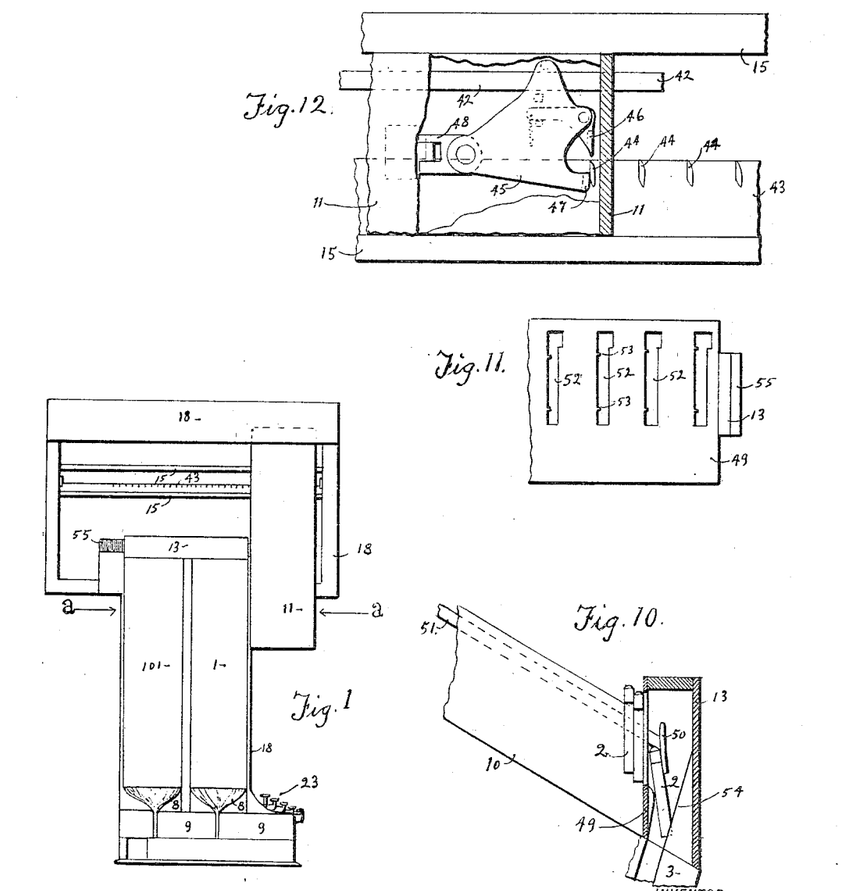
Figure 1 is a side elevation of a machine constructed in conformity to the present invention.
Fig. 10 is a detail view, fragmentary in form, of the distributer bar in cross section, and a side elevation of a fragment of the type galley of the type carriage, and discloses the manner of the escapement of the type into the distributer bar, from which it passes into the type chambers of the magazine.
Fig. 11 is a fragmentary detail view of the distributer bar, more particular that portion designated as the selector plate, of which a side elevation is shown, disclosing openings for the passage of the type and selector wards to correspond to nicks in the type, to select the type according to the nicks in each letter and the form of the openings are to be according to the form of the type to be selected, different selector plates being used for different sizes and kinds of type.
Fig. 12 is a vertical detail view, fragmentary in form, of the tramcar, the type carriage, and the escapement pawls, and discloses manner of moving the type carriage step by step.
Figure 8:
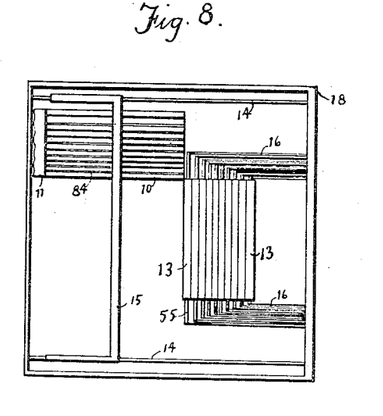
Fig. 8 is a horizontal view of the machine taken above the line *a, a*, of Fig. 1, and discloses a view of the type carriage at its starting point, a view of the tramcar at its starting point, a view of the tramways, the distributer bars, and the manner of holding the same in position.

The bell crank lever 16 is pivoted to the frame 18, and connected by a joint to the distributer bar 13, and has a spring 17, one end of which is secured to the frame 18. In the present construction there are ten distributer bars 13, each one of which is supported by a bell crank lever 16, as disclosed in Figs. 2, 8, and 9. Fig. 10 discloses the internal construction of a distributer bar. The distributer bar consists of a box, one side of which consists of a selector plate 49, having openings for type 52, and wards for selecting the type 53. These wards correspond to nicks in the type, so that when a type 2 having corresponding nicks moves toward the opening 52, it will pass through the opening and into the chamber of the distributer bar 13; but if the nicks in the type do not correspond to the wards 53 then it will not pass through the opening 52, and will remain in the type chamber 10. The type 2 is guided in its course of travel by a projecting piece 50, which is part of the type holding and releasing finger 51. The ward openings 52 are made wide enough to permit of the finger 51 passing through the same at the same time as the type passes therethrough. To the distributing bars 13 there is attached a piece 55, one piece on each end, which connects up with the bell crank lever 16.

Figure 9:
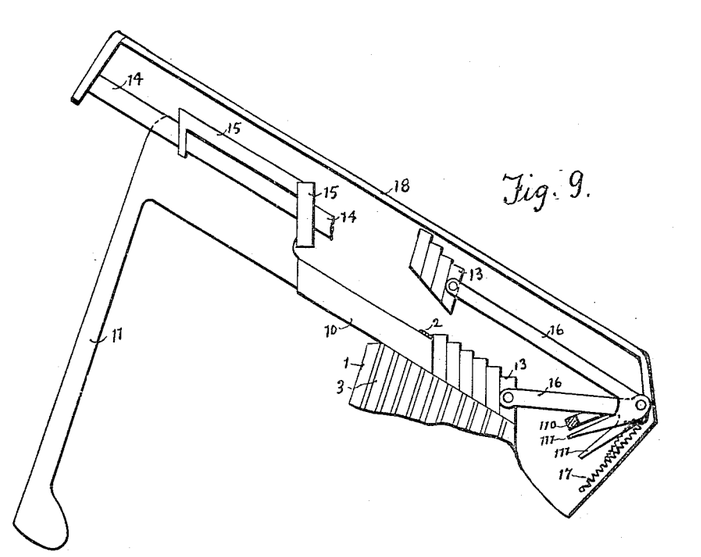
Fig. 9 is a side elevation, fragmentary in form, taken above the line *a, a*, of Fig. 2, and discloses four of the distributer bars raised up, and the type carriage moved a corresponding distance to the fifth distributer bar.
Figure 13:
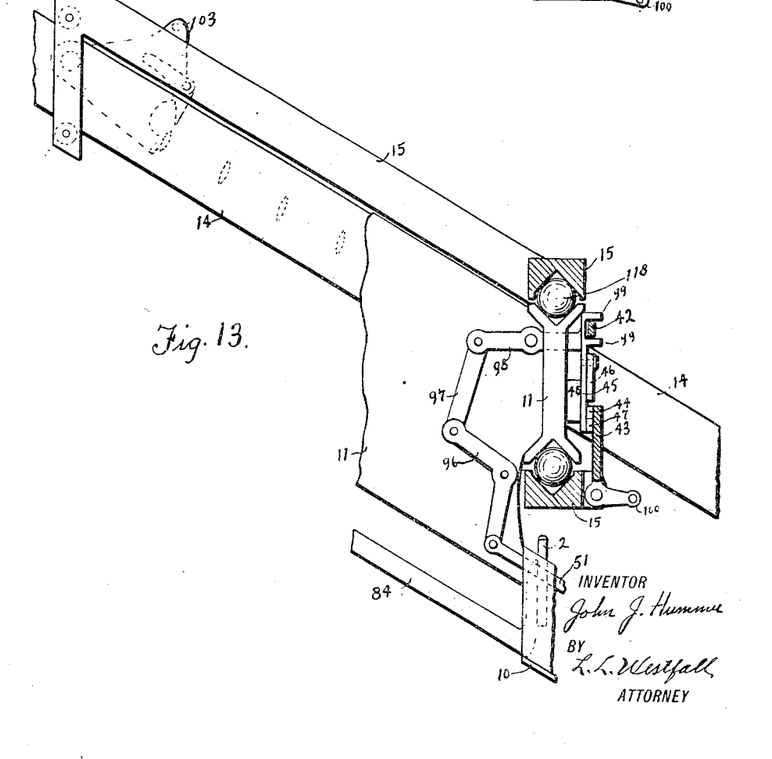
Fig. 13 is a fragmentary detail view of the type carriage, the tramcar, the tramways, the escapement mechanism of the tramcar, the escapement mechanism of the type carriage, and the mechanism for holding and releasing the type in the galley of the type carriage.

The distributing bars 13 are lifted up and removed out of the path of the tramcar and type carriage one at a time as the type carriage 11 reaches the farther end of its travel as shown in Fig. 1, and Fig. 5, and Fig. 9. In Fig. 9 four of the ten distributer bars 13 are shown as raised up and out of the way of the type carriage 11, and said type carriage is shown as under said distributer bars. Each time that one of the distributer bars 13 is raised up the tramcar 15 carrying the type carrier 11 moves one step down by gravity to the next distributer bar, which when the type carriage 11 has reached its position as shown in Fig. 1, raises up, and the tramcar moves by gravity to the next distributer bar, and so on until the last distributer bar has been raised up. In the present construction the raising and lowering of the distributer bars 13 is done by hand; but may be done by mechanical and automatic means not disclosed in the drawings. After the tramcar 15 has reached the end of its journey, the last distributer bar having been raised up, it is returned by hand operated levers, 19, 26, 32, and 120. To the lever 120 there is attached a handle 27, and is pivoted to the frame 18, and connected by another lever 32, which is pivoted to the frame 18, and is jointed to the lever 26, which is pivoted to the frame 18 and is connected with the bell crank lever 19, which extends on the outside of the frame 18, is pivoted thereto, and is slotted at the upper end, to receive a pin 30, which is attached to the tramcar 15. To operate the operator presses the handle 27 of the lever 120.

Having thus described my invention, what I claim is—

1. A type setting machine comprising a magazine, means comprising a pawl for retaining type in the magazine, a pawl escapement mechanism for releasing type from the magazine, means for composing the type as it is being released from the magazine, and means for distributing the type back into the magazine; the type throughout being in an upright position.

2. A type setting machine comprising a magazine divided into sections in parallel arrangement, each section having a number of type chambers set on an angle adapted for holding long type of standard length one behind the other in an upright position, means for releasing type from said type chambers singly and in the order of composition, means for removing said magazines from the body of the machine, and means for distributing type into the type chambers of the machine.

3. A type setting machine comprising a magazine divided into sections in parallel arrangement, each section having a number of type chambers set on an angle adapted for holding long type of standard length in an upright position, a raceway leading from each one of said type chambers, a common raceway connecting with each one of said raceways and leading to a common delivery point, means for holding type in said raceways in an upright position, means for releasing type from said type chambers singly and in the order of composition, means for removing said magazines, and means for distributing type into the type chambers of the magazine.

4. A type setting machine comprising a magazine divided into sections in parallel arrangement, each section having a number of type chambers set on an angle adapted for holding printers' type of standard length in an upright position, a raceway leading from each one of said type chambers, a common raceway for each one of the sections connecting with the type chambers in the section and leading to a common delivery point, means for holding the said type in its passage through the raceways in an upright position, means for releasing type from said type chambers in an upright position, singly, and in the order of composition, and means for removing the magazine quickly and easily from the body of the machine, and means for distributing type into the various type chambers of the magazine.

5. A type setting machine comprising a magazine divided into sections in parallel arrangement, each section having a number of type chambers set on an angle adapted for holding type having a head larger than the body and in an upright position, a raceway leading from the type chambers, common raceways connected therewith, means for delivering the type to a common delivery point in an upright position, means for releasing type from the type chambers coöperative with a manually operated keyboard and intermediate mechanism adapted for being shifted to connect and disconnect at the will of the operator with either one or the other half of the number of type chambers within the magazine, means for distributing type into the magazine, and means for removing the magazine by lifting it out of the machine.

6. A type setting machine comprising a plurality of magazines, each divided into sections in parallel arrangement, each section having a number of type chambers set on an angle adapted for holding type having a head larger than the body in an upright position, raceways leading from the type chambers, common raceways connecting therewith, means for delivering the type to a common delivery point in an upright position, means for releasing type from the type chambers singly and in the order of composition coöperative with a manually operative keyboard and intermediate mechanism capable of being shifted from contact with either one of the magazines and from contact with either onehalf of either one of the magazines at the will of the operator, means for removing the magazines; and means for distributing type back into the magazines, which comprises a type carriage capable of holding lines of type, and capable of moving by a step by step movement over the type chambers of the magazines.

7. A type setting machine comprising a plurality of magazines divided into sections in parallel arrangement, each section having a number of type chambers set on an angle and adapted for holding type in an upright position, raceways set at an angle and leading from the type chambers and adapted for delivering type in an upright position to a common delivery point, means for releasing type in the order of composition from the type chambers coöperative with a manually operative keyboard, and intermediate means for shifting operative contact of the keyboard with either one half of either one of the magazines, and means for removing the magazines; a type carriage capable of distributing type back into the magazines, and distributer bars having selector plates adapted for selecting the proper letters for each one of the type chambers of the magazines.

8. A type setting machine comprising a plurality of magazines, each divided into sections, the sections being placed in each magazine in parallel arrangement, each section having type chambers set on an angle and adapted for holding type in an upright position, raceways set at an angle leading from the type chambers to a common delivery point and adapted for transmitting type in an upright position in the order of composition to a type galley, means for releasing type in the order of composition from the type chambers coöperative with manually operative levers comprising a keyboard, and intermediate mechanism adapted for being shifted from contact with either one of the magazines and either onehalf of either magazine, means for removing the magazines, means for moving a type carriage step by step for distributing time into any and all of the type chambers of the magazines, a type carriage having a type feed, and means for holding and releasing the type within the type chambers of the carriage, and means for moving the carriage back to its starting point, distributer bars in parallel arrangement having each selector plates having openings and wards for selecting the proper letters for each one of the type chambers of the magazines above which they are placed, and means for raising said distributer bars out of the path of the type carriage, and means for replacing the same in position above the type chambers of the magazines.

In testimony whereof he has affixed his signature in presence of two witnesses.

JOHN J. HUMMEL.

Witnesses:
 L. L. WESTFALL,
 H. M. WILEY.

Copies of this patent may be obtained for five cents each, by addressing the "Commissioner of Patents, Washington, D. C."